(12) United States Patent
Lin

(10) Patent No.: US 10,737,238 B2
(45) Date of Patent: Aug. 11, 2020

(54) CERAMSITE PRODUCED BY USING RIVER/LAKE/SEA SLUDGE AND SEASHELL POWDER AS RAW MATERIALS AND PREPARATION METHOD THEREOF

(71) Applicant: QINGDAO YI ECO-ENVIRONMENTAL PROTECTION TECHNOLOGY CO., LTD, Qingdao (CN)

(72) Inventor: Rongliang Lin, Qingdao (CN)

(73) Assignee: QINGDAO YI ECO-ENVIRONMENTAL PROTECTION TECHNOLOGY CO., LTD, Qingdao (CN)

( * ) Notice: Subject to any disclaimer, the term of this patent is extended or adjusted under 35 U.S.C. 154(b) by 0 days.

(21) Appl. No.: 16/343,789

(22) PCT Filed: Nov. 28, 2017

(86) PCT No.: PCT/CN2017/113345
§ 371 (c)(1),
(2) Date: Apr. 22, 2019

(87) PCT Pub. No.: WO2018/099367
PCT Pub. Date: Jun. 7, 2018

(65) Prior Publication Data
US 2019/0247824 A1     Aug. 15, 2019

(30) Foreign Application Priority Data

Nov. 30, 2016   (CN) .......................... 2016 1 1077025

(51) Int. Cl.
| | | |
|---|---|---|
| *B01J 20/12* | (2006.01) | |
| *B01J 20/20* | (2006.01) | |
| *C04B 33/04* | (2006.01) | |
| *C04B 33/132* | (2006.01) | |
| *C04B 33/135* | (2006.01) | |
| *C04B 33/138* | (2006.01) | |
| *B01J 20/16* | (2006.01) | |
| *C02F 1/28* | (2006.01) | |
| *C04B 38/00* | (2006.01) | |
| *B01J 20/04* | (2006.01) | |
| *C04B 33/13* | (2006.01) | |

(52) U.S. Cl.
CPC ............. *B01J 20/12* (2013.01); *B01J 20/043* (2013.01); *B01J 20/16* (2013.01); *B01J 20/20* (2013.01); *C02F 1/288* (2013.01); *C04B 33/04* (2013.01); *C04B 33/13* (2013.01); *C04B 33/132* (2013.01); *C04B 33/138* (2013.01); *C04B 33/1321* (2013.01); *C04B 33/1352* (2013.01); *C04B 38/009* (2013.01); *B01J 2220/4881* (2013.01); *C02F 1/281* (2013.01); *C04B 2235/77* (2013.01); *C04B 2235/95* (2013.01); *C04B 2235/96* (2013.01); *Y02P 40/69* (2015.11)

(58) Field of Classification Search
CPC .......................... C04B 33/132; C04B 33/1321
See application file for complete search history.

(56) References Cited

FOREIGN PATENT DOCUMENTS

| | | |
|---|---|---|
| CN | 101229945 A | 7/2008 |
| CN | 101475362 A | 7/2009 |
| CN | 102173751 A | 9/2011 |
| CN | 103482754 A | 1/2014 |
| CN | 104163617 A | 11/2014 |
| CN | 105130288 A | 12/2015 |
| CN | 106495731 A | 3/2017 |
| KR | 100950231 B1 | 3/2010 |

OTHER PUBLICATIONS

Machine translation of CN 104163617, Nov. 2014. (Year: 2014).*

* cited by examiner

*Primary Examiner* — Karl E Group
(74) *Attorney, Agent, or Firm* — Bayramoglu Law Offices LLC

(57) ABSTRACT

A ceramsite produced by using a river/lake/sea sludge and seashell powder as raw materials and a preparation method thereof are provided. The ceramsite is made of the following raw materials in parts by weight: 15-50 parts of shell powder, 5-15 parts of kaolin, 1-5 parts of peat ash, 15-30 parts of siliceous shale, 15-40 parts of furnace slag, 10-20 parts of fly ash, 15-40 parts of zeolite, 10-30 parts of river/lake/sea sludge, and 10-25 parts of peat. The shell powder is pulverized to a particle size of 60-200 mesh in fineness. A content of silica in the siliceous shale is 87.0%-89.5%. The preparation method of the ceramsite includes the following steps: taking raw materials, pulverizing, stirring, granulating, calcining, and naturally cooling, so as to obtain the ceramsite.

6 Claims, No Drawings

CERAMSITE PRODUCED BY USING RIVER/LAKE/SEA SLUDGE AND SEASHELL POWDER AS RAW MATERIALS AND PREPARATION METHOD THEREOF

CROSS REFERENCE TO THE RELATED APPLICATIONS

This application is the national phase entry of International Application No. PCT/CN2017/113345, filed on Nov. 28, 2017, which is based upon and claims priority to Chinese Patent Application No. 201611077025.7, filed on Nov. 30, 2016, the entire contents of which are incorporated herein by reference.

TECHNICAL FIELD

The present invention belongs to the field of ceramsite, and specifically relates to a ceramsite produced by using river/lake/sea sludge and seashell powder as raw materials and a preparation method thereof.

BACKGROUND

As a kind of lightweight aggregate, ceramsite can be used instead of ordinary sand and stone to prepare lightweight aggregate concrete. The ceramsite has a wide application in departments of construction, environmental protection, metallurgy, chemical industry, petroleum, agriculture, etc. Especially in the aspect of water treatment, the ceramsite, as a filler for water treatment, has been used more and more widely. The calcination of ceramsite with the addition of sludge was first proposed by Nakouzi et al., wherein the ceramsite was obtained by pelletizing and calcination by using the sludge as a raw material, and adding an appropriate amount of auxiliary materials.

Shells, oysters, etc., are common marine products. At present, the development and utilization of seashell products generally focuses on processing the edible parts. While using the edible parts, a large number of shells are produced. Most of these shells are discarded, and only a small part of these shells are used for making feed. The shells discarded as garbage are piled up for a long time. The residual organic matters occupy space, decay and stink during the long-time storage process, which endangers the health of residents and causes serious pollution to the ecological environment. In recent years, shell products are increasing rapidly with the continuous expansion of the scale of aquaculture in coastal cities. It receives much concern as how to protect the ecological environment, control shell pollution, develop and utilize the large number of cheap and discarded shell resources, recycle and turn the garbage into treasure.

At present, some ceramsite products have been prepared by using seashell products as raw materials. A Chinese patent with the application number of 2013103846370 (Application Date: Aug. 29, 2013), "Method for Preparing a Shell Ceramsite Biocarrier", discloses a shell ceramsite biocarrier and a preparation method thereof. The biocarrier is a ceramsite sintered with shells, clay and a high temperature binder, and the prepared shell ceramsite biocarrier has rich foam structures, and is beneficial to the propagations of various microorganisms. But the cost is high, and the treatment effect on wastewater contaminated with heavy metals is limited. A Chinese patent with the application number of 2014103348562 (Application Date: Jul. 14, 2014), "Method for Producing Ceramsite, Ceramsite, and Application of Ceramsite", discloses a method for producing ceramsite. In the method, fly ash, sludge, clay and oyster shell powder are used as raw materials, wherein the sludge is subjected to a pressure filtration and a natural drying treatment in water works, and a water content of the sludge is 45-60%. The ceramsite is achieved by granulating and sintering the above raw materials at a high temperature, which is beneficial to reduce the consumption of the clay. The obtained ceramsite has good ability to adsorb pollutants, but has low strength and low bio-immobilization efficiency. A Chinese patent with the application number of 2015104033827 (Application Date: Jul. 11, 2015), "Ceramsite Aerated Block Added with shell powder" discloses a ceramsite aerated block prepared by shell powder, ceramsite, fly ash, quicklime, cement, aluminum powder, gypsum powder, sludge, calcium lignosulfonate, iron powder, nano aluminum oxide, carbon black, absolute ethanol and water. The block is not easy to crack, saves natural resources, but cannot absorb harmful substances.

Technical Problem

At present, there is a need for developing a method of preparing seashell powder into ceramsite that is suitable for sewage treatment and construction materials.

SUMMARY

Technical Solution

In order to solve the problems of the prior art, the present invention provides a ceramsite produced by using river/lake/sea sludge and seashell powder as raw materials and a preparation method thereof. The ceramsite has good sewage treatment effect, and is especially suitable for adsorption of heavy metal substances. Furthermore, the ceramsite is suitable for being used as building materials, which can absorb harmful substances generated during the decoration process of the building, further solves the environmental pollution problems caused by the stacking of a large number of discarded seashells, and protect the environment In order to achieve the above objective, the present invention provides the following technical solutions.

A ceramsite produced by using a river/lake/sea sludge and seashell powder as raw materials is obtained by the following raw materials in parts by weight: 15-50 parts of shell powder, 5-15 parts of kaolin, 1-5 parts of peat ash, 15-30 parts of siliceous shale, 15-40 parts of furnace slag, 10-20 parts of fly ash, 15-40 parts of zeolite, 10-30 parts of river/lake/sea sludge, and 10-25 parts of peat.

The river/lake/sea sludge is a sludge obtained from a river, a lake, or a sea; or a mixed sludge obtained from the river, the lake or the sea.

The shell powder is from the river, the lakes or the sea and is pulverized to a particle size of 60-200 mesh in fineness.

A content of silica in the siliceous shale is 87.0%-89.5%.

Preferably, the ceramsite produced by using a river/lake/sea sludge and seashell powder as raw materials obtained by the following raw materials in parts by weight: 26.8 parts of shell powder, 12.2 parts of kaolin, 3.4 parts of peat ash, 20.5 parts of siliceous shale, 30.2 parts of furnace slag, 18.4 parts of fly ash, 32.6 parts of zeolite, 25.5 parts of river/lake/sea sludge, and 18.7 parts of peat.

A preparation method of the ceramsite produced by using a river/lake/sea sludge and seashell powder as the raw materials includes the following specific steps:

(1) taking raw materials: weighing the raw materials according to the above parts by weight;

(2) pulverizing: pulverizing the kaolin, the siliceous shale, the furnace slag, the fly ash, the zeolite, the river/lake/sea sludge, and the peat to a particle size of 20-60 mesh;

(3) stirring: mixing the shell powder, the peat ash and the materials in the step (2) uniformly, adding water and stirring, and adjusting the water content of a mixed material to 15-25%;

(4) granulating: conveying the mixed material after being stirred in the step (3) to a granulator for granulation to obtain spherical ceramsite particles; and (5) calcination: drying the ceramsite particles in the step (4) at 100° C.-120° C. for 1-3 hours, then preheating at 200° C.-300° C. for 0.5-2 hours, and subsequently, performing a calcination on the ceramsite at 800° C.-950° C. to for 40-70 minutes, and naturally cooling to obtain the ceramsite having the seashell powder as the raw materials of the present invention.

The advantages of the present invention are as followed.

Using the above technical solution, the present invention has the following advantages. The ceramsite produced by using a river/lake/sea sludge and seashell powder as the raw materials has a good expansion rate, excellent adsorption performance, and a perfect sewage treatment effect. The ceramsite is especially suitable for adsorption of heavy metal substances, and can be further used as building materials, absorbing harmful substances generated during the building decoration process. The use of discarded shell powder and sludge for the production of ceramsite is a circular economic mode of the conversion of garbage and the utilization of renewable resources. The raw materials are widely available and easy to obtain, which can reduce the burden on urban environmental protection. The production cost is relatively low compared with similar products, thus having good economic and social benefits.

The preparation method of the ceramsite produced by using a river/lake/sea sludge and seashell powder as the raw materials includes the following specific steps (1) taking raw materials: weighing the raw materials according to the above parts by weight;

(2) pulverizing: pulverizing the kaolin, the siliceous shale, the furnace slag, the fly ash, the zeolite, the sea sludge, and the peat to a particle size of 40 mesh;

(3) stirring: mixing the shell powder, the peat ash and the materials in the step (2) uniformly, adding water and stirring, and adjusting a water content of a mixed material to 18%;

(4) granulating: conveying the mixed material after being stirred in the step (3) to a granulator for granulation to obtain spherical ceramsite particles; and (5) calcination: drying the ceramsite particles in the step (4) at 110° C. for 2 hours, then preheating at 240° C. for 1.5 hours, and subsequently, performing a calcination on the ceramsite at 850° C. for 60 minutes, and naturally cooling to obtain the ceramsite.

The performance parameters of the ceramsite are shown in Table 1.

TABLE 1

Performance Parameters of the Ceramsite of Embodiment 1

| Grain composition/ mm | Stacking density/ (kg/mm$^3$) | Cylindrical compressive strength (Mpa) | Water absorption at 1 hour (%) | Frost resistance (%) | Stability (%) |
|---|---|---|---|---|---|
| 5-10 | 635 | 4.48 | 8.16 | 3.78 | 1.01 |
| 10-20 | 780 | 4.42 | 7.94 | 3.55 | 0.95 |
| 20-30 | 860 | 4.45 | 7.76 | 3.32 | 0.92 |

The above ceramsite is used as a filler in sewage treatment, and the sewage is pre-treated by a sewage treatment plant. The change of the water quality before and after the sewage treatment is as shown in Table 2.

TABLE 2

Water Quality of Sewage before and after Treatment with Ceramsite in Embodiment 1

| | TP (mg/L) | SS (mg/L) | Pb (mg/L) | Cr (mg/L) | CODcr (mg/L) | BOD$_5$ (mg/L) | Ni (mg/L) |
|---|---|---|---|---|---|---|---|
| Before treatment | 5.5 | 356 | 2.9 | 4.6 | 300 | 120 | 3.6 |
| After treatment | 0.35 | 58 | 0.75 | 1.1 | 72 | 20 | 0.5 |

DETAILED DESCRIPTION OF THE EMBODIMENTS

The present invention will be further described below by combining with the embodiments.

Embodiment 1

The ceramsite produced by using a river/lake/sea sludge and seashell powder as raw materials is made of the following raw materials in parts by weight: 26.8 parts of shell powder, 12.2 parts of kaolin, 3.4 parts of peat ash, 20.5 parts of siliceous shale, 30.2 parts of furnace slag, 18.4 parts of fly ash, 32.6 parts of zeolite, 25.5 parts of sea sludge, and 18.7 parts of peat.

The shell powder is from a river, a lake or a sea, and is pulverized to a particle size of 100 mesh in fineness.

The content of silica in the siliceous shale is 87.6%.

Specifically, TP is total phosphorus, SS is suspended matter, Pb is lead, Cr is chromium, $COD_{cr}$ is chromium chemical oxygen demand, $BOD_5$ is 5-day biochemical oxygen demand, and Ni is nickel. The same English abbreviations in the other embodiments have the same meanings. It can be seen from the comparative data before and after sewage treatment with the ceramsite that when used for the sewage treatment, the ceramsite produced by the method of embodiment 1 can effectively reduce the heavy metal content in the sewage. Moreover, the total phosphorus and suspended matter content in the water is also significantly reduced. After the above treatment with the ceramsite, the water quality has been significantly improved.

Embodiment 2

The ceramsite produced by using a river/lake/sea sludge and seashell powder as raw materials is made of the following raw materials in parts by weight: 15 parts of shell powder, 5 parts of kaolin, 1 part of peat ash, 15 parts of siliceous shale, 15 parts of furnace slag, 10 parts of fly ash, 15 parts of zeolite, 10 parts of lake sludge, and 10 parts of peat.

The shell powder is from a river, a lake or the sea, and is pulverized to a particle size of 60 mesh in fineness.

The content of silica in the siliceous shale is 88.4%.

The preparation method of the ceramsite produced by using the river/lake/sea sludge and the seashell powder as the raw materials includes the following specific steps:

(1) taking raw materials: weighing the raw materials according to the above parts by weight;

(2) pulverizing: pulverizing the kaolin, the siliceous shale, the furnace slag, the fly ash, the zeolite, the lake sludge, and the peat to a particle size of 40 mesh;

(3) stirring: mixing the shell powder, the peat ash and the materials in the step (2) uniformly, adding water and stirring, and adjusting a water content of a mixed material to about 18%;

(4) granulating: conveying the mixed material after being stirred in the step (3) to a granulator for granulation to obtain spherical ceramsite particles; and (5) calcination: drying the ceramsite particles in the step (4) at 110° C. for 2 hours, then preheating at 240° C. for 1.5 hours, and subsequently, performing a calcination on the ceramsite at 850° C. for 60 minutes, and naturally cooling to obtain the ceramsite.

When used for sewage treatment, the ceramsite can effectively reduce the heavy metal ion content in the sewage.

Embodiment 3

The ceramsite produced by using a river/lake/sea sludge and seashell powder as raw materials is made of the following raw materials in parts by weight: 50 parts of shell powder, 15 parts of kaolin, 5 parts of peat ash, 30 parts of siliceous shale, 40 parts of furnace slag, 20 parts of fly ash, 40 parts of zeolite, 30 parts of Yangtze River sludge, and 25 parts of peat.

The shell powder is from a river, a lake or a sea, and is pulverized to a particle size of 80 mesh in fineness.

The content of silica in the siliceous shale is 88.4%.

The preparation method of the ceramsite produced by using the river/lake/sea sludge and the seashell powder as the raw materials includes the following specific steps:

(1) taking raw materials: weighing the raw materials according to the above parts by weight;

(2) pulverizing: pulverizing the kaolin, the siliceous shale, the furnace slag, the fly ash, the zeolite, the Yangtze River sludge, and the peat to a particle size of 40 mesh;

(3) stirring: mixing the shell powder, the peat ash and the materials in the step (2) uniformly, adding water and stirring, and adjusting a water content of a mixed material to 18%;

(4) granulating: conveying the mixed material after being stirred in the step (3) to a granulator for granulation to obtain spherical ceramsite particles; and (5) calcination: drying the ceramsite particles in the step (4) at 110° C. for 2 hours, then preheating at 240° C. for 1.5 hours, and subsequently, performing a calcination on the ceramsite at 850° C. for 60 minutes, and naturally cooling to obtain the ceramsite.

When used for sewage treatment, the ceramsite can effectively reduce the heavy metal ion content in the sewage.

Embodiment 4

The ceramsite produced by using a river/lake/sea sludge and seashell powder as raw materials is made of the following raw materials in parts by weight: 28.7 parts of shell powder, 12.2 parts of kaolin, 3.4 parts of peat ash, 13.6 parts of siliceous shale, 15.2 parts of furnace slag, 6 parts of fly ash, 18.6 parts of zeolite, 24.2 parts of river bottom sludge, and 15.7 parts of peat.

The shell powder is from a river, a lake or a sea, and is pulverized to a particle size of 100 mesh in fineness.

The content of silica in the siliceous shale is 87.6%.

The preparation method of the ceramsite produced by using the river/lake/sea sludge and the seashell powder as the raw materials is the same as that in embodiment 1.

The ceramsite of the present embodiment is applied to building materials, and the specific conditions of the ceramsite such as strength and thermal conductivity are shown in Table 3.

TABLE 3

Specific Parameters of the Ceramsite of Embodiment 4

|  | Stacking density/ (kg/mm³) | Compressive strength (Mpa) | Water absorption (%) | Thermal conductivity (W/m · k) |
| --- | --- | --- | --- | --- |
| Treatment with ceramsite of embodiment 4 | 528 | ≥9.5 | 7.88 | ≤0.12 |

As can be seen from the above, the ceramsite of embodiment 4 has relatively high strength, good water absorption and good thermal conductivity, which can be applied to the field of building materials.

Embodiment 5

The ceramsite produced by using a river/lake/sea sludge and seashell powder as raw materials is made of the following raw materials in parts by weight: 22.2 parts of shell powder, 12.2 parts of kaolin, 3.4 parts of peat ash, 10.5 parts of siliceous shale, 15.2 parts of furnace slag, 8.4 parts of fly ash, 18.6 parts of zeolite, 20.5 parts of sea sludge, and 15.7 parts of peat.

The shell powder is from a river, a lake or a sea, and is pulverized to a particle size of 100 mesh in fineness.

The content of silica in the siliceous shale is 87.6%.

The preparation method of the ceramsite produced by using the river/lake/sea sludge and the seashell powder as the raw materials is the same as that in embodiment 1.

The ceramsite of the present embodiment is applied to building materials, and the specific conditions of the ceramsite such as strength and thermal conductivity are shown in Table 4.

TABLE 4

Specific Parameters of the Ceramsite of Embodiment 5

|  | Stacking density/ (kg/mm³) | Compressive strength (Mpa) | Water absorption (%) | Thermal conductivity (W/m · k) |
| --- | --- | --- | --- | --- |
| Treatment with ceramsite of embodiment 5 | 539 | ≥9.5 | 7.88 | ≤0.12 |

As can be seen from the above, the ceramsite of embodiment 5 has a slightly larger stacking density than the ceramsite of embodiment 4, both ceramsites of embodiment 4 and embodiment 5 have relatively high strength, good water absorption and good thermal conductivity, and can be applied to the field of building materials.

Embodiment 6

The ceramsite produced by using a river/lake/sea sludge and seashell powder as raw materials is made of the following raw materials in parts by weight: 26.8 parts of shell powder, 12.2 parts of kaolin, 3.4 parts of peat ash, 20.5 parts of siliceous shale, 30.2 parts of furnace slag, 18.4 parts of fly ash, 32.6 parts of zeolite, 25.5 parts of sea sludge, and 18.7 parts of peat.

The shell powder is from a river, a lake or a sea, and is pulverized to a particle size of 100 mesh in fineness.

The content of silica in the siliceous shale is 87.6%.

The preparation method of the ceramsite produced by using the river/lake/sea sludge and the seashell powder as the raw materials includes the following specific steps:

(1) taking raw materials: weighing the raw materials according to the above parts by weight;

(2) pulverizing: pulverizing the kaolin, the siliceous shale, the furnace slag, the fly ash, the zeolite, the sea sludge, and the peat to a particle size of 40 mesh;

(3) stirring: mixing the shell powder, the peat ash and the materials in the step (2) uniformly, adding water and stirring, and adjusting a water content of a mixed material to 18%;

(4) granulating: conveying the mixed material after being stirred in the step (3) to a granulator for granulation to obtain spherical ceramsite particles; and (5) calcination: drying the ceramsite particles in the step (4) at 110° C. for 2 hours, then preheating at 240° C. for 1.5 hours, and subsequently, performing a calcination on the ceramsite at 850° C. for 60 minutes, and naturally cooling to obtain the ceramsite.

The ceramsite in embodiment 6 was added into the textile wastewater taken from a textile factory in Shandong. The adding amount of the ceramsite was 6 g per liter of the wastewater, and the mixture was stirred at room temperature for 60 minutes after the ceramsite was added. The measured results are shown in Table 5.

TABLE 5

Results of Treatment of Textile Wastewater with the Ceramsite of Embodiment 6

|  | Chroma | CODcr(mg/L) | SS(mg/L) |
| --- | --- | --- | --- |
| Original value | 1485 | 1286 | 868 |
| Treatment with ceramsite of embodiment 6 | 52 | 184.5 | 31.6 |

As can be seen from the above, the ceramsite of embodiment 6 can significantly reduce the content of CODcr and SS in the textile wastewater, and effectively adsorb heavy metals in the wastewater.

Embodiment 7

The ceramsite produced by using a river/lake/sea sludge and seashell powder as raw materials is made of the following raw materials in parts by weight: 26.8 parts of shell powder, 12.2 parts of kaolin, 3.4 parts of peat ash, 20.5 parts of siliceous shale, 30.2 parts of furnace slag, 18.4 parts of fly ash, 32.6 parts of modified zeolite, 25.5 parts of a river/lake/sea sludge (the river/lake/sea sludge is a mixture of a Yangtze River sludge, a river sludge, a lake sludge and a sea sludge, and the proportion in parts by weight thereof is: the Yangtze River sludge:the river sludge:the lake sludge:the sea sludge=1:1:2:3), 18.7 parts of peat, and 2.4 parts of activated alumina.

The shell powder is from a river, a lake or a sea, and is pulverized to a particle size of 120 mesh in fineness.

The content of silica in the siliceous shale is 88.2%.

The production method of the modified zeolite is as follows:

selecting natural zeolite and dividing into three equal parts, denoted as A, B, C respectively;

soaking the zeolite, A with 1 mol/L hydrochloric acid solution for 2 hours, washing and filtering, and recovering the zeolite A;

soaking the zeolite B with a 1 mol/L aluminum sulfate solution for 2 hours, washing and filtering, and recovering the zeolite A;

soaking the zeolite C with 1 mol/L hydrochloric acid solution for 2 hours, then soaking the zeolite C with 1 mol/L aluminum sulfate solution for 2 hours, washing and filtering, and recovering the zeolite C; and mixing the zeolite A, the zeolite B, and the zeolite C and calcining the zeolite A, the zeolite B, and the zeolite C at 450° C. for 60 minutes to obtain the modified zeolite.

The preparation method of the ceramsite produced by using the river/lake/sea sludge and the seashell powder as the raw materials includes the following specific steps:

(1) taking raw materials: weighing the raw materials according to the above parts by weight;

(2) pulverizing: pulverizing the kaolin, the siliceous shale, the furnace slag, the fly ash, the modified zeolite, the river/lake/sea sludge, the peat, and the activated alumina to a particle size of 40 mesh;

(3) stirring: mixing the shell powder, the peat ash and the materials in the step (2) uniformly, adding water and stirring, and adjusting a water content of a mixed material to 18%;

(4) granulating: conveying the mixed material after being stirred in the step (3) to a granulator for granulation to obtain spherical ceramsite particles; and (5) calcination: drying the ceramsite particles in the step (4) at 110° C. for 2 hours, then preheating at 240° C. for 1.5 hours, and subsequently, performing a calcination on the ceramsite at 850° C. for 60 minutes, and naturally cooling to obtain the ceramsite.

The ceramsite in embodiment 7 was added into the same textile wastewater as that in embodiment 6. The adding amount of the ceramsite was 6 g per liter of the wastewater, and the mixture was stirred at room temperature for 60 minutes after the ceramsite was added. The measured results are shown in Table 6.

TABLE 6

Results of Treatment of Textile Wastewater with the Ceramsite of Embodiment 7

|  | Chroma | CODcr(mg/L) | SS(mg/L) |
| --- | --- | --- | --- |
| Original value | 1485 | 1286 | 868 |
| Treatment with ceramsite of embodiment 7 | 36 | 166.8 | 20.6 |

As can be seen from the above, the ceramsite of embodiment 7 can significantly reduce the content of CODcr and SS in the textile wastewater. Compared with the results of the textile wastewater treatment with the ceramsite of embodiment 6, it can be found that the ceramsite of embodiment 7 has a stronger adsorption capacity for heavy metals in the wastewater and a better treatment effect on the wastewater by modifying the zeolite and adding the activated alumina.

Embodiment 8

The ceramsite produced by using a river/lake/sea sludge and seashell powder as raw materials is made of the following raw materials in parts by weight: 16.8 parts of oyster shell powder, 12.2 parts of kaolin, 5.4 parts of peat ash, 30.2 parts of furnace slag, 25.5 parts of fly ash, 18.4 parts of clay, 32.6 parts of modified zeolite, 25.5 parts of sludge (the sludge is a mixture of a Yangtze River sludge, a river sludge, a lake sludge and a sea sludge, and the proportion in parts by weight thereof is: the Yangtze River sludge:the river sludge:the lake sludge:the sea sludge=1:1:2:3), 18.7 parts of peat, and 2.4 parts of activated alumina.

The production method of the modified zeolite is as follows:

selecting natural zeolite and dividing into two equal parts, denoted as A, and B respectively;

soaking the zeolite A with 1 mol/L sodium hydroxide solution for 2 hours, controlling the temperature at 100° C. during soaking, washing and filtering, and recovering the zeolite A; further soaking the zeolite A with 1 mol/L sodium hydroxide solution for 2 hours, controlling the temperature at 100° C. during soaking, washing and filtering, and recovering the zeolite A; stirring constantly during the above soaking processes;

soaking the zeolite B with 1 mol/L ammonium chloride solution for 2 hours, controlling the temperature at 100° C. during soaking, washing and filtering, and recovering the zeolite B; further soaking the zeolite B with 1 mol/L ammonium chloride solution for 2 hours, controlling the temperature at 100° C. during soaking, washing and filtering, and recovering the zeolite B; stirring constantly during the above soaking processes;

mixing the zeolite, A and the zeolite B and calcining the zeolite A and the zeolite B at 450° C. for 60 minutes to obtain the modified zeolite.

The preparation method of the ceramsite produced by using the river/lake/sea sludge and the seashell powder as the raw materials includes the following specific steps:

(1) taking raw materials: weighing the raw materials according to the above parts by weight;

(2) pulverizing: pulverizing the kaolin, the furnace slag, the fly ash, the clay, the modified zeolite, the sludge, the peat, and the activated alumina to a particle size of 40 mesh;

(3) stirring: pulverizing the oyster shell powder to a particle size of 40 mesh, mixing the oyster shell powder, the peat ash and the materials in the step (2) uniformly, adding water and stirring, and adjusting a water content of a mixed material to 18%;

(4) granulating: conveying the mixed material after being stirred in the step (3) to a granulator for granulation to obtain spherical ceramsite particles; and (5) calcination: drying the ceramsite particles in the step (4) at 110° C. for 2 hours, then preheating at 240° C. for 1.5 hours, and subsequently, performing a calcination on the ceramsite at 850° C. to sinter for 60 minutes, and naturally cooling to obtain the ceramsite.

The raw materials of the ceramsite of embodiment 8 were adjusted to obtain four new kinds of ceramsites. The treatment effects of the obtained four ceramsites on the sewage were compared to the treatment effect of the ceramsite of embodiment 8 on the sewage. The specific conditions of the four groups of comparative ceramsites are as follows:

comparative group 1: the proportion of the fly ash is adjusted to 20 parts, the clay is adjusted to 25 parts, and the rest of the raw materials remain unchanged;

comparative group 2: the oyster shell powder is replaced with the furnace slag, i.e., the parts by weight of the furnace slag are 35.2 parts, and the rest of the raw materials remain unchanged;

comparative group 3: the oyster shell powder is replaced with the shell powder, and the rest of the raw materials remain unchanged; and comparative group 4: the modified zeolite is replaced with natural zeolite, and the rest of the raw materials remain unchanged.

The sewage generated by a thermal power plant in Shandong Province was taken and treated with the ceramsites of embodiment 8 and the four comparative groups, and the adding amount of the ceramsite is 8 g per liter of the sewage. The measured results are shown in Table 7.

TABLE 7

Sewage Treatment Results of Ceramsite of embodiment 8 and the Comparative Groups

|  | TP (mg/L) | SS (mg/L) | Pb (mg/L) | Cr (mg/L) | CODcr (mg/L) | BOD$_5$ (mg/L) | Ni (mg/L) |
| --- | --- | --- | --- | --- | --- | --- | --- |
| Before treatment | 6.5 | 384 | 3.2 | 7.8 | 353 | 146 | 3.9 |
| Treatment with ceramsite of embodiment 8 | 0.46 | 64 | 0.82 | 1.2 | 78 | 28 | 0.7 |
| Treatment with ceramsite of comparative group 1 | 0.68 | 88 | 1.37 | 1.66 | 95 | 63 | 0.94 |
| Treatment with ceramsite of comparative group 2 | 0.71 | 91 | 1.45 | 1.75 | 89 | 57 | 1.03 |
| Treatment with ceramsite of comparative group 3 | 0.45 | 69 | 0.81 | 1.3 | 82 | 30 | 0.6 |

TABLE 7-continued

Sewage Treatment Results of Ceramsite of embodiment 8 and the Comparative Groups

|  | TP (mg/L) | SS (mg/L) | Pb (mg/L) | Cr (mg/L) | CODcr (mg/L) | $BOD_5$ (mg/L) | Ni (mg/L) |
|---|---|---|---|---|---|---|---|
| Treatment with ceramsite of comparative group 4 | 1.21 | 116 | 1.83 | 1.64 | 97 | 101 | 0.98 |

As can be seen from the above data, the ceramsite of embodiment 8 has a significantly better effect than those of the comparative group 1 and the comparative group 2 on the treatment of wastewater, especially the wastewater having a high heavy metal content produced by the thermal power plant. In the comparative group 1, the parts by weight of the fly ash and the clay were adjusted, which makes a big difference. In the comparative group 2, the oyster shell powder were replaced and complemented by the furnace slag as the raw material in the parts by weight, which also makes a big difference. The data in the comparative group 3 shows that the ceramsite produced by using the shell powder as the raw material has a similar effect to the ceramsite produced by using the oyster shell powder as the raw material on the treatment of the wastewater contaminated with heavy metals. In the comparative group 4, the effect of the ceramsite where the modified zeolite is replaced with the natural zeolite is decreased as well, indicating that the modified zeolite used in the production of the ceramsite of the present invention has a better effect than the natural zeolite.

In the present embodiment, the ratio of the various raw materials has an effect on the expansion coefficient and adsorption performance of the ceramsite. For example, in a high-temperature calcination, the oyster shell powder produces a more sufficient amount of gas, which increases the expansion degree of the ceramsite, thereby affecting the adsorption of the ceramsite, and further affecting the effect of the ceramsite on the water treatment. During the preparation process of the ceramsite, from drying to preheating, there is sufficient time for the components of the various raw materials to react with each other, so as to increase the expansion ratio of the ceramsite, and produce the ceramsite having the best expansion ratio.

The ceramsite of embodiment 8 has a stacking density of 418 (kg/mm$^3$), a compressive strength of 11.6 MPa, a water absorption of 7.94%, and a thermal conductivity of 0.06 (W/m. k). Based on the above indexes, the ceramsite can also be applied to building insulation materials.

The specific implementing ways of the present invention are described in conjunction with the above-mentioned embodiments. However, it is not a limitation to the scope of the present invention. Those skilled in the art should understand that, on the basis of the technical scheme of the present invention, various modifications or variations made by those skilled in the art without any creative work are still within the scope of the present invention.

What is claimed is:

1. A ceramsite, comprising:
as raw materials by weight 15-50 parts of seashell powder, 5-15 parts of kaolin, 1-5 parts of peat ash, 15-30 parts of siliceous shale, 15-40 parts of furnace slag, 10-20 parts of fly ash, 15-40 parts of zeolite, 10-30 parts of river/lake/sea sludge, and 10-25 parts of peat,
wherein the ceramsite is obtained by calcination comprising drying ceramsite particles at 100° C.-120° C. for 1-3 hours, then preheating at 200° C.-300° C. for 0.5-2 hours, and subsequently, performing the calcination at 800° C.-950° C. for 40-70 minutes, and naturally cooling.

2. The ceramsite of claim 1, wherein, the shell powder is pulverized to a particle size of 60-200 mesh in fineness.

3. The ceramsite of claim 1, wherein, a content of silica in the siliceous shale is 87.0%-89.5%.

4. The ceramsite of claim 1, wherein, the ceramsite comprises as the raw materials by weight 26.8 parts of the seashell powder, 12.2 parts of the kaolin, 3.4 parts of the peat ash, 20.5 parts of the siliceous shale, 30.2 parts of the furnace slag, 18.4 parts of the fly ash, 32.6 parts of the zeolite, 25.5 parts of the river/lake/sea sludge, and 18.7 parts of the peat.

5. A preparation method of the ceramsite of claim 1, comprising the following steps:
(1) taking raw materials: weighing the raw materials according to the parts by weight;
(2) pulverizing: pulverizing the kaolin, the siliceous shale, the furnace slag, the fly ash, the zeolite, the river/lake/sea sludge, and the peat to a particle size of 20-60 mesh;
(3) stirring: mixing the seashell powder, the peat ash and the materials in the step (2) uniformly, adding water and stirring, and adjusting a water content of a mixed material to 15%-25%;
(4) granulating: conveying the mixed material after being stirred in the step (3) to a granulator for granulation to obtain spherical ceramsite particles; and
(5) calcination: drying the ceramsite particles in the step (4) at 100° C.-120° C. for 1-3 hours, then preheating at 200° C.-300° C. for 0.5-2 hours, and subsequently, performing a calcination on the ceramsite at 800° C.-950° C. for 40-70 minutes, and naturally cooling to obtain the ceramsite produced by using the river/lake/sea sludge and the seashell powder as the raw materials.

6. The preparation method of claim 5, wherein, the ceramsite comprises as the raw materials by weight 26.8 parts of the seashell powder, 12.2 parts of the kaolin, 3.4 parts of the peat ash, 20.5 parts of the siliceous shale, 30.2 parts of the furnace slag, 18.4 parts of the fly ash, 32.6 parts of the zeolite, 25.5 parts of the river/lake/sea sludge, and 18.7 parts of the peat.

* * * * *